Figure 2A:
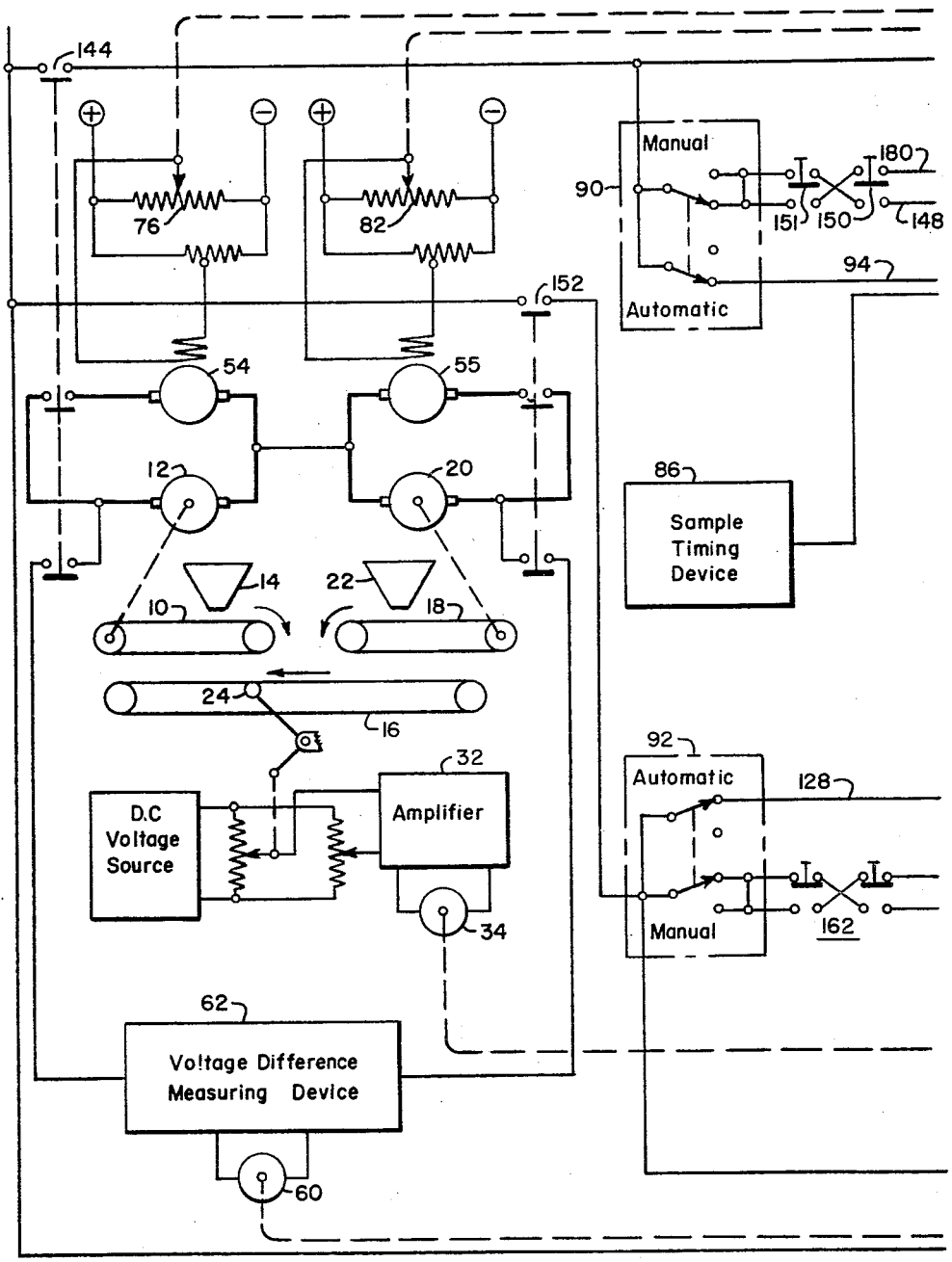

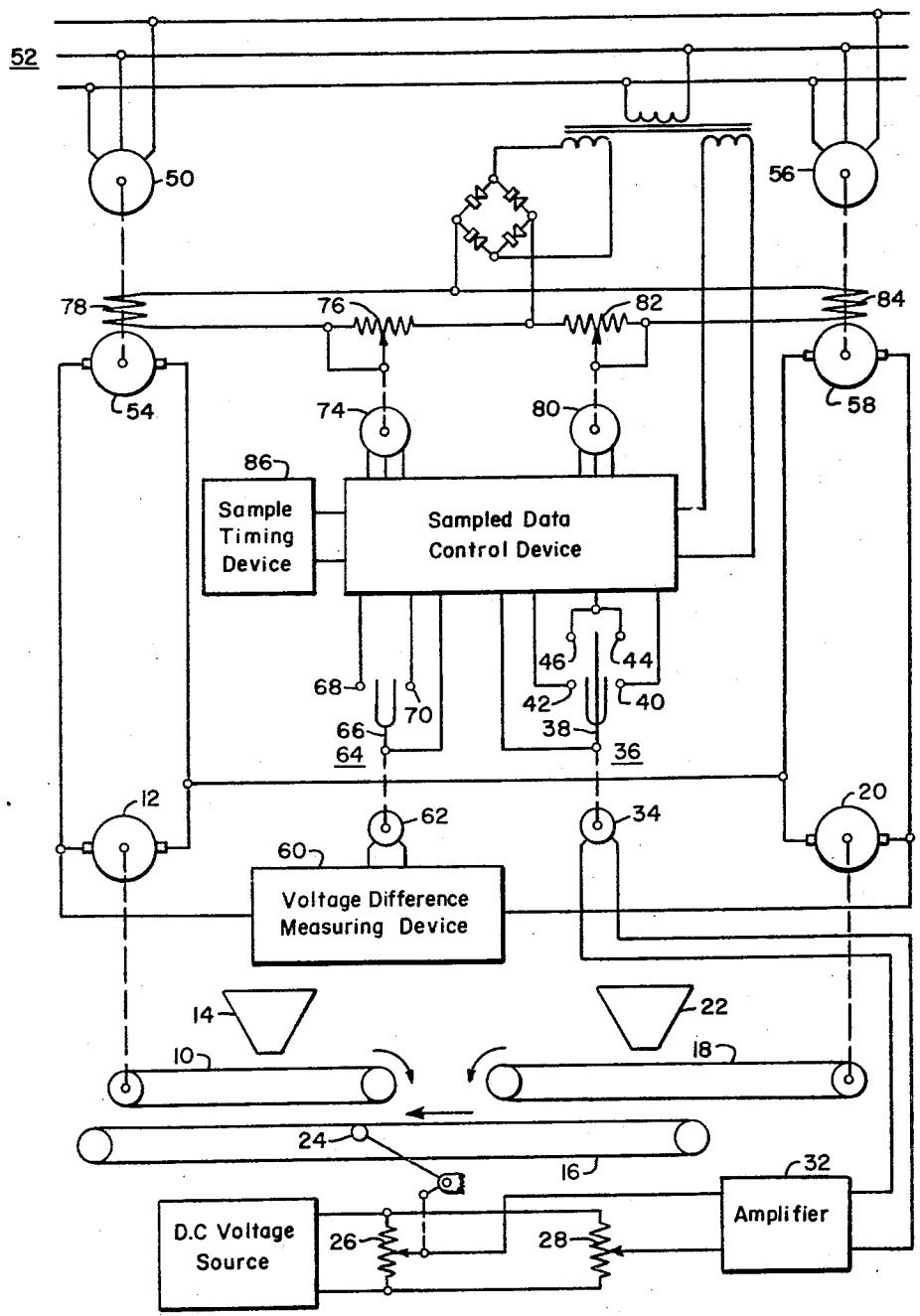
Fig. I.

United States Patent Office 2,921,712
Patented Jan. 19, 1960

2,921,712
CONTROL APPARATUS FOR A MOTOR DEVICE
Henry A. Dickerson, Snyder, N.Y., assignor to Westinghouse Electric Corporation, East Pittsburgh, Pa., a corporation of Pennsylvania
Application November 21, 1957, Serial No. 698,003
8 Claims. (Cl. 222—55)

The present invention relates, in general, to control apparatus for a motor device or the like apparatus, and more particularly to regulating control apparatus for at least one motor operative with a machine device, such as a materials handling device or the like for controlling an operative condition of said machine device, such as speed or the amount of material handled by said machine device.

It is an object of the present invention to provide improved control apparatus for a device including one or more motors, which apparatus is operative to better control a predetermined operative condition of at least one motor, such as the operative speed thereof, in accordance with a sampled or measured error or difference between a predetermined actual operative condition of the latter motor or motors relative to a desired operative condition for the latter motor or motors.

It is a different object to provide improved control apparatus for one or more motors, which apparatus is operative to better selectively increase or decrease a predetermined operative parameter or condition of said motor or motors for maintaining substantially as desired said predetermined operative parameter or condition for said motor or motors.

It is another object to provide improved control apparatus for at least one motor for better controlling the actual operation of the motor or motors relative to a desired operation of said motor or motors in a sampled manner and operative to provide a variable correction time period for any error in said operation of the motor or motors as a function of the amount or magnitude of said error, and also if desired as a function of either one motor operating alone or as a function of both motors operating together.

It is a further object to provide improved control apparatus for one or more motors for better controlling the actual operation of said one or more motors relative to a predetermined desired operation for said one or more motors and relative to the operation of each motor as compared to the operation of any other motor.

It is an additional object to provide improved control apparatus for a plurality of motors operative with a machine device such as a materials handling conveyor, wherein the motors are better controlled to correct any variation in a predetermined operation of said machine device, and further, wherein the motors are better controlled to maintain a predetermined loading of the respective motors when the motors are operating together during the operation of said machine device and, in addition, if desired, with the time period of said correction control beng determined by the magntude or amount of correction desired.

Figure 2B:
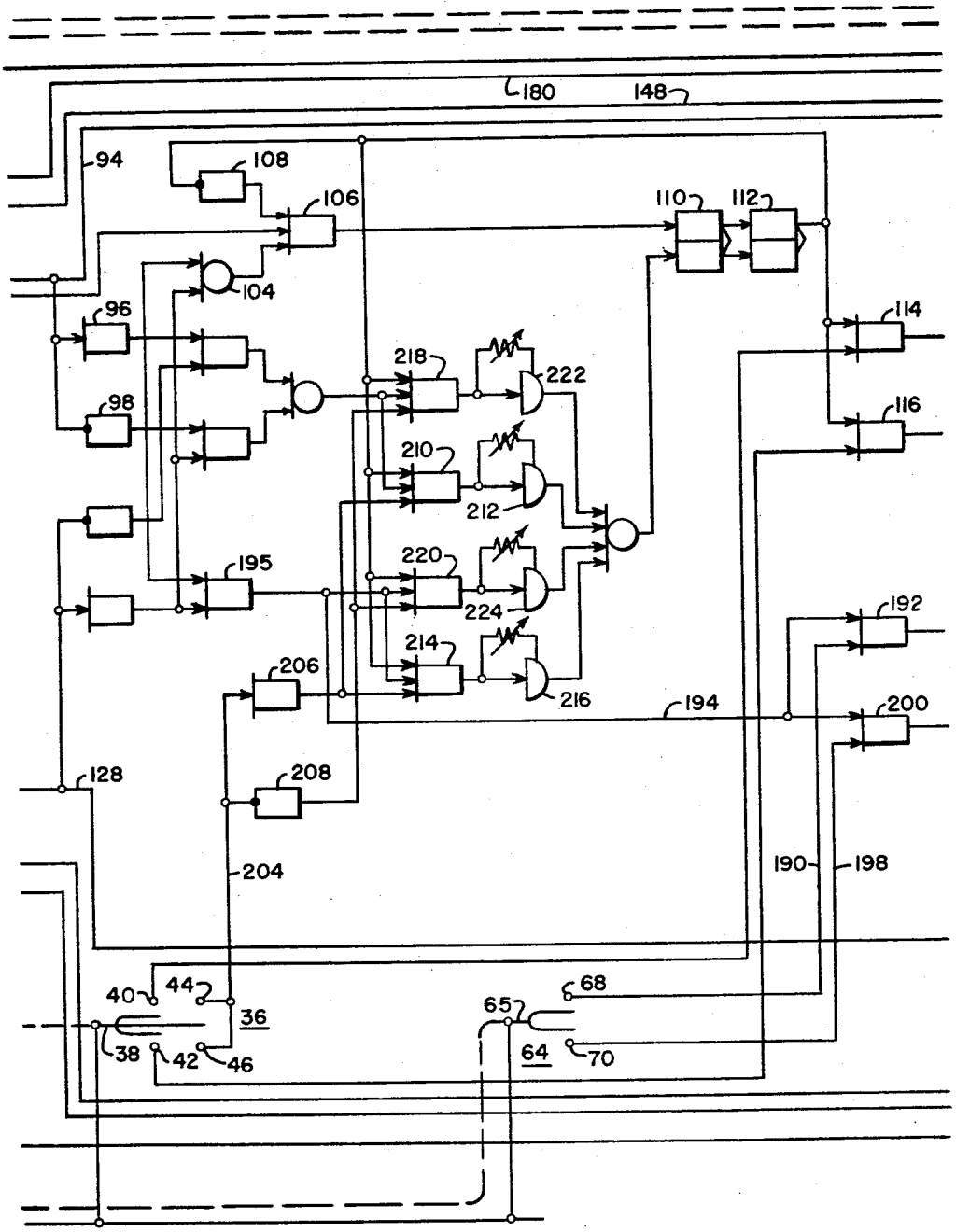
Figure 2C:
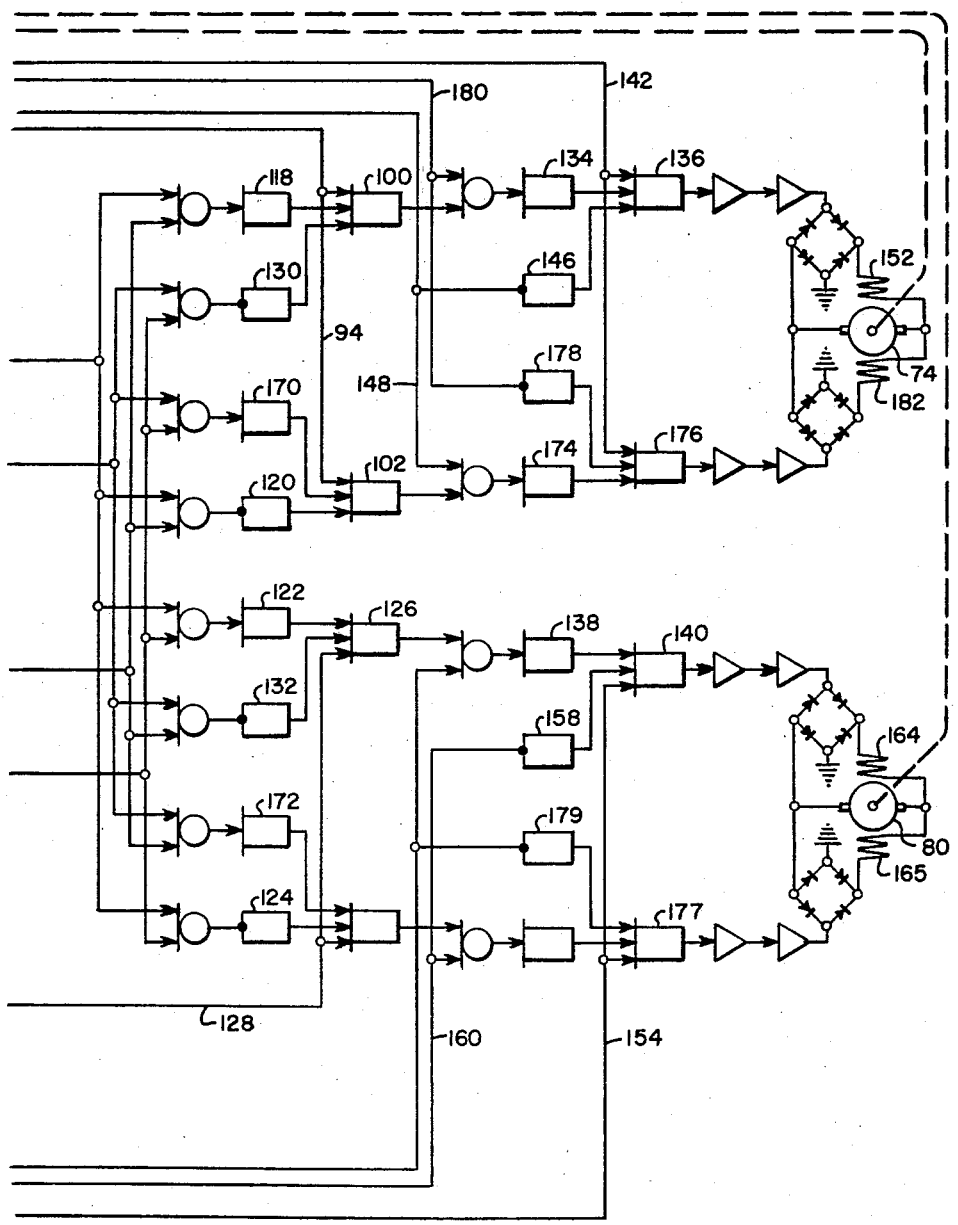

These and other objects and advantages of the present invention will become still more apparent from a study of the following description taken in conjunction with the drawings, wherein:

Figure 1 is a diagrammatic showing of the control apparatus in accordance with the present invention; and Fig. 2 is a schematic showing of the control apparatus in accordance with the present invention, and appears as Figs. 2A, 2B, and 2C on Sheets No. 2, 3, and 4 respectively.

In Fig. 1 there is shown a first material handling conveyor 10 operative with a motor 12 for providing material from a hopper or the like 14 onto a second conveyor 16 for supplying said material to a material utilization or treatment device such as a sintering furnace or the like, not shown. An additional material handling conveyor 18 is operative with a variable speed motor 20 for providing material from a similar hopper or like device 22 onto the conveyor 16. The operative speed of the respective motors 12 and 20 regarding the operative speed of the respective conveyors 10 and 18 is operative to determine the amount of material supplied to the conveyor 16, with the latter conveyor 16 operating at substantially a constant speed. A material weight or amount measuring or sensing member 24 is operative with the conveyor 16 and is connected to adjust the output from a variable impedance member such as the position of a movable contact arm on a potentiometer 26. The latter potentiometer 26 along with a reference potentiometer 28 are energized by a common direct current voltage source 30. The second reference potentiometer 28 has a contact arm which may be selectively positioned in accordance with a predetermined amount of material on the conveyor, such that any voltage difference between the contact arm on the potentiometer 26 and the contact arm on the potentiometer 28 may be supplied through a suitable amplifier device 32 to a servomotor 34 operative with an error detector device 36 for providing a control signal in accordance with any error between the amount of material actually present on the conveyor 16 relative to a predetermined desired amount of material on said conveyor 16 in accordance with the setting of the contact arm on the reference potentiometer 28. Thusly, the error detector device 36 includes a movable arm 38 which is movable relative to a first contact 40 and a second contact 42 for providing first and second control signals dependent upon respectively the actual amount of material being less than or greater than said predetermined amount of material on the conveyor 16. In addition, the movable contact arm 38 is operative with a pair of contacts 44 and 46 for providing a third control signal when the amount of any error is greater than a predetermined amount of error and relative to the error required to establish the signals from contacts 40 or 42.

More specifically, if, for example, it is desired that fifty units of material be present on the conveyor 16 and the contact arm on the reference potentiometer 28 is so set, then the contact 40 may be operative with the movable contact arm 38 when forty-nine units of material are actually present on the conveyor 16 and it is desired to increase the amount of material on the conveyor by one unit of error relative to the predetermined desired amount of material on the conveyor 16. Further, the contact 42 may be operative with the contact arm 38 when the actual amount of material present on the conveyor 16 is fifty-one units and, accordingly, it is desired to decrease the amount of material on the conveyor 16 by one unit. The pair of contacts 44 and 46 are operative with the contact arm 38 when the amount of material on the conveyor 16 is respectively either greater than the predetermined desired amount by an amount of error determined by the spacing between the contacts 44 and 46. Similarly, the contact 46 may be operative when the actual amount of material is a predetermined error greater than the predetermined desired amount. More specifically, if the amount of material actually on the conveyor 16 is in the order of fifty-five units, then the contact 46 may become operative with the control arm 38 and when the actual amount of material on the conveyor 16 is forty-five units or less, then the contact 44 may become operative with the movable contact arm 38. In other words, the contacts 44 and 46 are operative to provide a high error control signal and each of the respective contacts 40 and 42 are operative to provide a low error control signal for correcting the operation of the motor 12 relative to the conveyor 10 and for correcting the operation of the motor 20 relative to the conveyor 18, since the amount of material fed out of the respective hoppers 14 and 22 is proportional to the speed of the respective conveyors 10 and 18, and is hence proportional to the speed of the respective motors 12 and 20.

An alternating current motor 50 is operative with an alternating current voltage source 52 for driving a direct current generator 54, which latter direct current generator is connected to control the operation of the direct current motor 12. A second alternating current motor 56 is operative with the alternating current voltage source 52 for driving a second direct current generator 58 for controlling the operation of the direct current motor 20. The two generators 54 and 58 can also be driven from a single A.C. motor or any other suitable device.

A voltage difference measuring device 60 is operatively connected to sense any difference in the armature currents of the respective direct current motors 12 and 20 such that any difference in the generator voltages applied to the respective direct current motors 12 and 20 is thereby sensed and thusly, any difference in the operating speeds of the conveyor 10 as compared to the conveyor 18 is thereby sensed. In this manner, the voltage difference measuring device 60 is operative to provide a control signal in accordance with any difference in the speed of the respective direct current motors 12 and 20 and thereby any difference in the amount of material supplied by the conveyor 10 to the conveyor 16 as compared to the amount of material supplied by the conveyor 18 to the conveyor 16. The control signal from the voltage difference measuring device is supplied to a control motor 62 operative with a second error detector device 64. The detector device 64 includes a movable control arm 66 and a first contact 68 operative with the movable control arm when one of the motors, for example, the direct current motor 12 is loaded less than the other of said motors, for example, the direct current motor 20. The detector device 64 includes a second contact 70 operative with the control arm 66 when the loading of said motors is the reverse of the latter above situation.

The sampled data control device 72 is operative with the control signals received from the first detector device 36 and the second detector device 64 to control the operation of a first motor 74 operative with an adjustable impedance member 76 in series with the field winding 78 of the direct current generator 54 and thereby operative to control the speed of the direct current motor 12. A second motor 80 is operative with an adjustable impedance device 82 in series with the field winding 84 for the direct current generator 58 supplying energy to the direct current motor 20 such that the motor 80 is operative to vary the operating speed of the direct current motor 20. In this manner, the amount of material supplied onto the conveyor 16 as well as the balance of the loading between the respective motors 12 and 20 can be controlled by the motors 74 and 80 operated by the sampled data control device 72.

A sample timing device 86 is provided for controlling the sample time period of the sampled data control device 72 as apparent to and well known to persons skilled in this particular art. In this regard, it should be here noted that copending application Serial No. 685,907, filed September 24, 1957, by the same inventor, entitled Motor Control Apparatus, and assigned to the same assignee as the present application, may be referred to for a more detailed description of the operation of the sample timing device 86 if desired.

In Fig. 2 there is shown a first control switch 90 operative to determine the manual or automatic operation of the first direct current motor 12. A second control switch 92 is provided for controlling the manual or automatic operation of the direct current motor 20. Assuming both control switches 90 and 92 are set in their automatic positions, then a control signal is supplied from the first motor control switch 90 through the conductor 94 to one input of an AND device 96, one input of a NOT device 98, one input of an AND device 100 and one input of an AND device 102. The AND device 96 then supplies a control signal through the OR device 104 to one input of an AND device 106. A second input of this latter AND device 106 is energized by the pulsed timing signal from the sampling interval timer 86. A third input of the AND device 106 is energized by the output signal from the NOT device 108, as the latter NOT device is not receiving a control signal on its input. Thusly, an output signal is provided from the AND device 106 during the time interval of energization by the sampling interval timer 86 and is applied to the ON input of a MEMORY device 110 which, in turn, provides an output signal to the ON input of the MEMORY device 112. The latter MEMORY device 112, in turn, provides an output signal which is applied back to the input of the NOT device 108 to thusly cut off the output signal from the NOT device 108 and thereby deenergize the one input of the AND device 106 to terminate its output signal. In addition, the output signal from the MEMORY device 112 is applied to one input of each of an AND device 114 and an AND device 116.

Referring to the error detector 36, the contact 40 when operative with the movable control arm 38 provides a control signal to the second input of the AND device 114 for increasing the amount of material supplied to the conveyor 16. On the other hand, when the control arm 38 is operative with the contact 42, a control signal is applied to the second input of the AND device 116 to effectively decrease the amount of material supplied to the conveyor 16. Assuming that the contact 40 is supplying a control signal to the input of the AND device 114, the latter AND device 114 provides an output signal to the input of an increase motor 12 controlling AND device 118, to the input of a decrease motor 12 controlling NOT device 120, to the input of an increase motor 20 controlling AND device 122 and to the input of a decrease motor 20 controlling NOT device 124. Thusly, the output signal from the AND device 118 energizes one input of AND device 100 and the output signal from AND device 122 energizes one input of AND device 126. A second input of AND device 100 is energized by the conductor 94 leading from the control switch 90. A second input of the AND device 126 is energized if the control switch 92 is in its automatic position for providing a suitable control signal through the conductor 128. In addition, the third input of the AND device 100 is energized by the NOT device 130 in that its input is not now energized. Similarly, the third input of the AND device 126 is energized by the output signal from the NOT device 132 since the input of the NOT device 132 is not energized by the output of the AND device 114.

Thusly, the output signal from the AND device 100 is supplied through the AND device 134 to one input of the increase motor 12 controlling AND device 136. Similarly, the output signal from the AND device 126 is supplied through the AND device 138 to one input of the increase motor 20 controlling AND device 140. A second input of the AND device 136 is energized through the conductor 142 due to the automatic closing of the contact member 144 when the motor 12 is in operation. The third input of the AND device 136 is energized by the output signal from the NOT device 146, the input of which is not energized through the conductor 148 as controlled by the decrease control switch member 150 within the motor 12 control switch 90. Thusly, the output signal from the AND device 136 is applied to energize the increase speed field winding 152 of the motor 74 and thereby to control the rheostat 76 the speed of the direct current motor 12 to increase the speed of the latter direct current motor 12 and thusly the amount of material supplied to the conveyor 16 by the conveyor 10.

The first input of the AND device 140 is energized by the output signal from the AND device 138 as previously explained. A second input of the AND device 140 is energized through the conductor 154 as controlled by the switch member 156 which is automatically closed when the motor 20 is in operation, as would be well known to persons skilled in this art. A third input of the AND device 140 is energized by the output signal from the NOT device 158, the input of which is not energized through the conductor 160 as determined by the control switches 162, operative with the motor 20 control switch 92. The output signal from the AND device 140 is operative to energize the increased speed controlling field winding 164 of the motor 80 to effectively increase the operating speed of the motor 20 through the rheostat 82 and thereby increase the amount of material supplied from the conveyor 18 to the conveyor 16.

If, on the other hand, the movable control arm 38 of the material error detector 36 is operative with the contact 42, then a control signal is supplied to the second input of the decrease controlling AND device 116 and not to the second input of the increase controlling AND device 114. Thusly, the former AND device 116 produces an output signal which is applied to the input of the NOT device 130 to deenergize one input of the motor 12 increase controlling AND device 100, which signal also is applied to one input of the AND device 170 to, in turn, energize one input of the motor 12 decrease controlling AND device 102. In addition, the output signal from the AND device 116 is supplied to one input of the NOT device 132 to thereby deenergize one input of the motor 20 increase controlling AND device 126 and, in addition, is supplied to one input of the AND device 172 to energize one input of the motor 20 decrease controlling AND device 174. A second input of the AND device 102 is energized through the conductor 94. The third input of the AND device 102 is energized by the output signal from the NOT device 120 which does not now receive a control signal from the AND device 114. Thusly, the AND device 102 provides an output signal through the AND device 174 to one input of the motor 12 decrease controlling AND device 176. A second input of the AND device 176 is energized through the conductor 142, and the third input of the AND device 176 is energized by the NOT device 178 which does not receive an input signal through the conductor 180. Thusly, the AND device 176 produces an output signal to energize the decrease direction field winding 182 of the control motor 74 and to effectively decrease the operating speed of the motor 12 through the rheostat 76.

In a similar manner the motor 20 decrease control AND device 177 is energized by the output signal from AND device 174, by the conductor 154 if motor 20 is operating, and by the NOT device 179 such that AND device 177 produces an output signal to energize the decrease direction field winding 165 of motor 80 operative with the rheostat 82 and motor 20 for decreasing the speed of motor 20.

In the operation of the balanced detector device 64 if the motor 20, for example, is supplying a greater portion of the total load than is the motor 12 relative to the supply of material onto the conveyor 16, when both of the feeder conveyors 10 and 18 are in operation, the voltage of generator 55 will be higher than that of generator 54, and the contact arm 65 will come in contact with the contactor 68 to supply through conductor 190 a control signal applied to one input of the increase motor 12 and decrease motor 20 control AND device 192. The second input of the latter AND device 192 is supplied through conductor 194 by the AND device 195 when both of the control switch members 90 and 92 are in their automatic position and both of the motors 12 and 20 are operating. The output signal from the AND device 192 is supplied to energize the input of the AND device 118 and hence energize one input of the AND device 100 for energizing the field winding 152 and controlling the increased operation of the first motor 12. The output signal from the AND device 192 is also supplied to the NOT device 120 to effectively not energize the decrease motor 12 control field winding 182. The output signal from the AND device 192 is supplied to NOT device 132 to thusly not energize the increase motor 20 control field winding 164. This same output signal from the AND device 192 is also supplied to the AND device 172 for effecting the energization of one input of the decrease motor 20 controlling AND device 174.

The second input of the increase motor 12 controlling AND device 100 is energized through the conductor 94 when the switch 90 is in its automatic control position and the motor 12 is operating. The third and last input of the AND device 100 is energized from the output of the NOT device 130, the input of which is not now energized. Thusly, there results an energization in the increase motor 12 control field winding 152 for the control motor 74 operative with the rheostat 76 to increase the operating speed of the motor 12.

The decrease motor 20 control AND device 174 has a second input energized from the NOT device 124, and has a third input energized through the conductor 128 when the control switch 92 is in its automatic position and the motor 20 is operating. Thusly, the AND device 174 provides a control signal to energize through the AND device 177 the decrease motor 20 control field winding 165 of the motor 80 operative with the rheostat 82 for decreasing the operative speed of the motor 20.

Similarly, when the motor 20 is supplying a lesser portion of the total load relative to the motor 12, in other words the reverse of the latter situation, then the movable contact arm 65 of the balanced detector 64 is operative with the contactor 70 to energize through the conductor 198 one input of the decrease motor 12 and increase motor 20 control AND device 200 operative through the various logic elements in a generally similar manner as previously explained relative to the AND device 192 to decrease the operating speed of the motor 12 and to increase the operating speed of the motor 20. The latter operation is the reverse of but generally similar to the way that the AND device 192 increased the operating speed of the motor 12 and decreased the operating speed of the motor 20.

Relative to the operation of the material error detector 36 when the movable control arm 38 is operative with either of the contacts 44 or 46, a control signal is applied through the conductor 204 to energize one input of the AND device 206 and one input of the NOT device 208. Thusly, when the movable control arm 38 is operative with one of the contactors 44 or 46, the control signal supplied through the conductor 204 energizes the AND device 206 such that it provides an output signal to energize the AND device 210 and the AND device 214 operative with the time delay elements 212 and 216 respectively for providing a longer time period or duration for the control output signal from the MEMORY device 212 to energize as may be desired the control windings of the respective motors 74 and 80 as required for performing a desired correction operation relative to the motors 12 and 20. When the movable control arm 38 is not operative with either of the contactors 44 and 46, then a control signal is not supplied through the conductor 204 and thusly the NOT device 208 has an output signal that is supplied to the AND devices 218 and 220 operative with the respective shorter period time delay elements 222 and 224. In this regard, the time delay element 222 is provided relative to the operation of either one of the motors 12 and 20 operating alone, and the time delay element 212 for a greater time period or duration for either one of the motors 12 and 20 operating alone. The time delay element 222 has substantially twice the time period of operation as the time delay element 224, in that the latter element 224 is operative when both of motors 12 and 20 are operating together. The time delay element 216 has a greater time period than the element 224 and is operative when both of motors 12 and 20 are operating. In this regard, the time delay element 216 may have substantially one-half the time period of the time delay element 212.

It should be noted that when both motors 12 and 20 are in operation, if either one of the selector switches 90 and 92 are turned from the automatic operation position to the manual operation position, then the control signal from that control switch will be removed from the control AND elements operative with the respective conductor 94 or 128 operative with that control switch. More specifically, if the control switch 90 is changed from its automatic control position to its manual control position, then the control signal supplied through the conductor 94 will be removed from the AND devices 100 and 102, and thusly, the automatically controlled regulating action of the motor 12 is terminated. However, manual control of the motor 12 is still provided using the control switches 150 and 151, if desired, and the conductors 148 and 180.

In this regard, either one or both of the control motors 12 and 20 can be operated individually or together, and on either manual control or automatic control for every combination of one or two drives and control modes of operation. Also, manual control is possible from any number of parallel connected push-button locations as may be desired.

When either one or both of the drives are on manual control, the output quantity of material supplied to the conveyor 16 is the total of the operating drives. When either drive is operating alone and on the automatic control position for its respective control switch, the regulator action with the respective time delay elements 222 and 212 is as required for optimum performance of the one drive. When both of the drive motors 12 and 20 are operating with each of the control switches 90 and 92 in their respective automatic control positions, optimum regulator action as required for control of two drives feeding into one common system is provided with one or the other of the time delay elements 224 and 216, along with an effective superimposed continuous balancing action provided by the balancing detector device 64 operative to hold the respective drive outputs substantially the same or equal.

When any one drive motor, namely, either 12 or 20, is running on manual control with the other on automatic control, the balancing action provided by the detector device 64 is terminated, and the regulator action is as required for optimum performance of one drive and total output is regulated by the error detector 36. For example, if the output from the manually controlled drive is changed, the regulator action provided by the error detector 36 will automatically change the output from the other drive in the opposite direction and by the same amount to maintain substantially the same total amount of material supplied to the conveyor 16.

The disclosed regulator system for operation with a greater number of drive motors could be readily modified by a person skilled in this art and in view of the present teachings to provide modified correction interval timers and one added balance control detector device 64 and its associated circuitry for each added drive to control any number of motor drives feeding in parallel onto a single conveyor 16. For example, assume there are three drives and the error detector 36 is arranged to control one of said drives called the master. For example, assume the motor 12 is the master, then two balance controls, each including a balance detector such as detector device 64, may be provided, one for each of the other two drives called slave drives. For example, motor 20 may be one slave drive and an additional motor the other slave drive. Each balance control would hold the slave speed substantially equal to that of the master drive motor, namely, the motor 12. Assume the optimum correction time equal to the time interval "T" when the master drive is operating alone and one-half the time interval "T" when one slave is operating in addition to the master drive, for example, when motor 20 and motor 12 are operating. Further assume the optimum correction time to be equal to one-third "T" when both slaves are operating with the master motor 12. Under the above operating conditions the timers for the high error corrections could then be set for "x" times the above respective time intervals, where "x" is the ratio between the amounts of the respective errors for the low error signal and the high error signal from the material error detector 36. The error detector is arranged to measure the difference between the total output and a predetermined reference or desired output of material supplied to the conveyor 16.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. In control apparatus for at least a pair of motors operative with a machine device, the combination of a condition sensing member operatively connected to said machine device and responsive to a predetermined operating condition of said machine device, a first error sensing apparatus operatively connected to said condition sensing member for providing a first control signal that varies in accordance with a predetermined relationship between the actual operating condition of said machine device and a predetermined desired operating condition of said machine device, a second error sensing apparatus operatively connected to at least one of said motors and responsive to the loading of at least the latter said one motor for providing a second control signal that varies in accordance with a predetermined relationship of the loading of said one motor, an error correction signal source operative to provide a third control signal for correcting the operation of at least one of said motors, and a motor operation correction apparatus operative with said motor and responsive to said first and second control signals for controlling the supply of said third control signal to at least one of said motors.

2. In control apparatus for a pair of motors operative with a machine device, the combination of an operation condition sensing means operative with said machine device and responsive to a predetermined actual operating condition of said machine device, error sensing apparatus operative with said condition sensing means for providing a first control signal that varies in accordance with a predetermined relationship between said actual operating condition of said machine device and a predetermined desired operating condition of said machine device, an error correction signal source operative to provide a second control signal for correcting the operation of at least one of said motors, and motor operation correction means operative with said motors and including a control member for providing an output signal and having at least a first input and a second input that must be energized before said output signal is provided, with said first input being responsive to said first control signal and with said second input being responsive to said second control signal, and with said control member output being connected to control the operation of said motors.

3. In control apparatus for a pair of motors operative with a material handling device, the combination of material measuring means operative with said material handling device and responsive to the amount of material actually handled by said device, an error sensing apparatus operative with said material measuring means for providing a first control signal that varies in accordance with the error between the amount of material actually handled by said device and a predetermined desired amount of material to be handled by said device, a timer device for providing discrete sample intervals of time, an error correction signal source operative with said timer device for providing a second control signal during each of said sample intervals of time for correcting the operation of at least one of said motors, motor operating sensing means for providing a third control signal when at least one of said motors is operating, and a motor operation correction means operative with each of said motors and responsive to said third control signal for controlling the supply of said second control signals to at least said latter one motor until said first control signal is no longer provided.

4. In control apparatus for at least a pair of motors operative with a material handling device, the combination of a material measuring member operative with said material handling device and responsive to the amount of material actually present on a predetermined portion of said device, a first error sensing apparatus operative with said material measuring member for providing a first control signal that varies in accordance with the difference between the amount of material actually present on said portion of said device relative to a predetermined desired amount of material to be present on said portion of said device, an error correction signal source operative to provide a second control signal for correcting the operation of said motors, a second error sensing apparatus operative with said motors for providing a third control signal in accordance with any difference in predetermined operating conditions of said respective motors, and a motor operation correction device operative with said motor and responsive to each of said first control signal and said third control signal for controlling the effective correction by said second control signal upon the operation of said motors.

5. In control apparatus for at least a pair of motors operative with a material handling device, the combination of material measuring means operative with said material handling device and responsive to the amount of material actually handled by said device, error sensing apparatus operative with said material measuring member for providing a first control signal that has a value in accordance with any error between the amount of material actually handled by said device and a predetermined desired amount of material to be handled by said device, an error correction signal source operative to provide a second control signal for correcting said error by correcting the operation of said motors, a motor operation sensing device operatively connected to said pair of motors by sensing any difference in a predetermined operating condition of said motors, and a motor operation correction apparatus operative with said motor, with said motor operation correction apparatus having at least three inputs and an output and with each of said inputs requiring energization before said output is energized, with a first of said inputs being energized by said first control signal and a second input being energized by said second control signal and another input being energized by said third control signal, and with said output being operative to control the operation of at least one of said motors when each of said inputs are energized.

6. In control apparatus for at least a pair of motors operative with a machine device, the combination of machine device operation sensing means operative with said machine device and responsive to a predetermined operation of said machine device, an error sensing apparatus operative with said operation sensing means for providing a first control signal that has a value in accordance with a predetermined relationship between the actual operation of said machine device and a predetermined desired operation of said machine device, a timer device for providing periodic sample control intervals, an error correction signal source operative with said timer device for providing an error correction signal having a predetermined value during each of said intervals, a motor operation comparison device operatively connected to each of said motors for providing a second control signal in accordance with the difference between a predetermined operation of at least said pair of motors, and a motor operation correction apparatus operative with said motor, with said motor operation correction apparatus including a control device having at least three inputs and an output and with said output being energized only when each of said inputs is energized, with one of said inputs being responsive to said first control signal and another of said inputs being responsive to said error correction signal and still another of said inputs being responsive to said second control signal, and with said output being connected to control the operation of at least one of said motors and thereby the operation of said machine device.

7. In control apparatus for at least a pair of motors operative with a material handling device, the combination of a material measuring member operative with said material handling device and responsive to the amount of material actually handled by said device, a first error sensing device operative with said material measuring member for providing a first control signal for smaller errors and a second control signal for larger errors, with each of said first and second control signals having a predetermined value depending upon the difference between the amount of material actually handled by said device and a predetermined desired amount of material to be handled by said device, a timer device for providing sample control signals at discrete intervals of time, an error correction signal source operative with said timer device and responsive to said sample control signals for providing a third error correction control signal for correcting the operation of said motor, a second error sensing device operative with at least two of said motors for providing a fourth control signal in accordance with the difference between a predetermined operation of said two motors, with said error correction signal source being responsive to one of said first and second control signals for determining the time duration of said third control signal, and motor operation correction apparatus operative with said motor and responsive to said fourth control signal and the other of said first control signal and said second control signal for controlling the supply of said third error correction control signal to said motor.

8. In control apparatus for at least a pair of motors operative with a material handling device, the combination of a material measuring member operative with said material handling device and responsive to the amount of material actually handled by said device, a first error sensing apparatus operative with said material measuring member for providing a first control signal that varies in accordance with a first predetermined error relationship between the amount of material actually handled by said device and a predetermined desired amount of material to be handled by said device and a second control signal that varies in accordance with a similar second predetermined and greater error relationship, an error correction signal source operative to provide a third error correction control signal for correcting the operation of said motor, a first timer device operative with said signal source for providing said third control signal at discrete periods of time, a second timer device responsive to said second control signal for determining the time duration of said third control signal, a second error sensing apparatus operative with at least two of said motors for providing a fourth control signal in accordance with any unbalance between the loading of said two motors, and motor operation correction apparatus operative with at least said two motors and responsive to said first control signal and said third control signal for controlling the operation of at least said two motors to correct for any error between the amount of material actually handled by said device and said predetermined desired amount of material, with said motor operation correction apparatus being responsive to said fourth control signal for controlling the operation of at least said two motors for substantially balancing the loading of said two motors.

References Cited in the file of this patent
UNITED STATES PATENTS

| | | |
|---|---|---|
| 1,922,883 | Crago | Aug. 15, 1933 |
| 2,325,381 | Edwards | July 27, 1943 |